Patented June 15, 1937

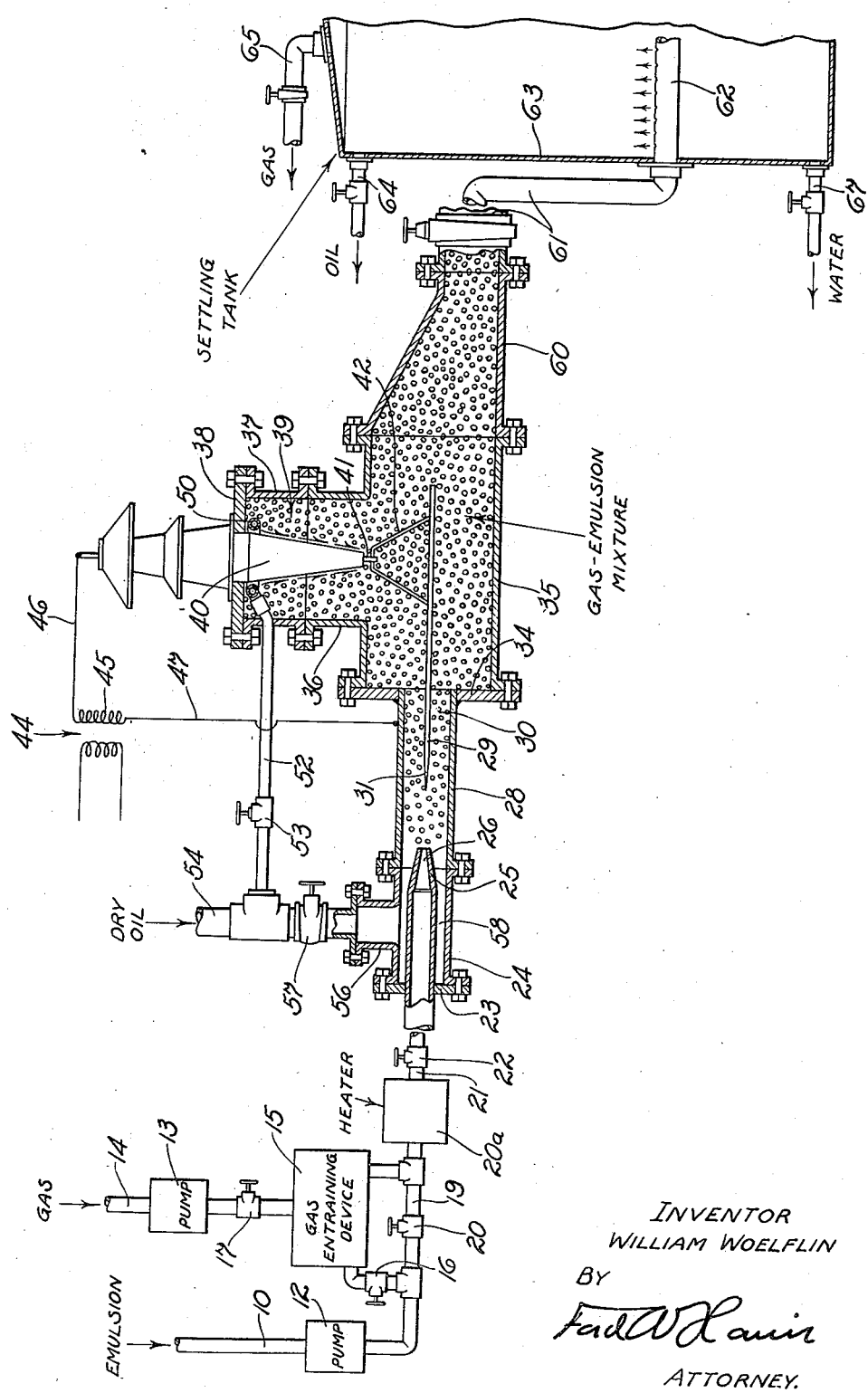

2,083,802

UNITED STATES PATENT OFFICE 2,083,802

PROCESS AND APPARATUS FOR TREATING EMULSIONS

William Woelflin, Long Beach, Calif., assignor to Petroleum Rectifying Company of California, Los Angeles, Calif., a corporation of California Application May 23, 1934, Serial No. 727,122
Renewed May 13, 1937

8 Claims. (Cl. 204—24)

My invention relates to a novel process and apparatus for electrically treating emulsions. One use of the invention of particular importance in the processing of petroleum products includes the dehydration of crude petroleum emulsions. For the purpose of illustration and definiteness, the invention will be disclosed in this capacity, though it will be understood that the principles and apparatus herein set forth can be applied to various types of emulsions to effect electric treatment thereof.

Certain types of emulsions can be subjected to the action of an electric field to coalesce the dispersed droplets thereof. Certain of these emulsions, however, can be treated only with difficulty and by the use of auxiliary steps and processes such as recirculation of the emulsion through the field, adding chemicals thereto to facilitate dehydration, etc. The present invention has for one of its objects the provision of a novel method and apparatus which facilitates the treatment of emulsions and often eliminates the necessity for such auxiliary treatment.

I have found that electric treatment of such emulsions can be facilitated by forming a gas-emulsion mixture which is subjected to the action of an electric field, and the present invention involves a novel method and apparatus for thus treating an emulsion, and, in addition, involves a novel method of forming such a gas-emulsion mixture, as well as a novel apparatus useful in this capacity.

In such a gas-emulsion mixture, masses of gas, usually small, are surrounded by a liquid environment of the emulsion to be treated. If sufficient gas is used, the gas-emulsion mixture actually takes the form of a foam, and it is an object of the present invention to provide a method and apparatus for treating emulsions by forming this emulsion into a foam, if desired, and establishing an electric field which acts upon this foam, the constituents being subsequently separated from the gas.

I am aware that it has been previously proposed to bubble gas upward through a body of emulsion in a treating space in which an electric field is established. However, the function of this gas was in effect to establish a gas agitation for the purpose of breaking any short-circuiting chains which may form between the electrodes during treatment of the emulsion, such gas agitation being designed to eliminate mechanical agitation which effected the same results. Such a process should, however, be clearly distinguished from the present improvement. In prior processes the gas performed no useful function aside from the agitation and consequent breaking of short-circuiting chains effected by this gas moving upward through the emulsion. In the present invention much larger quantities of the gas are usually utilized if the emulsion is formed into a foam. In this connection the word "foam" as used in the present application includes a material a large portion of which is composed of masses of gas, these masses being surrounded by relatively thin layers of emulsion, the volume of the gas being equal to or greater than the volume of the emulsion in this foam. In the present invention the gas co-operates in a novel manner with electric treatment, for the large amount of gas utilized in forming the foam permits the emulsion to be formed into relatively thin films or layers, if desired. In addition, by utilizing an electric field of sufficient intensity to ionize the gas masses, these relatively thin films or layers of emulsion in the foam will be actively acted upon by the ionized gas masses. A much greater treating surface for such ionizing action is thus presented by the emulsion, and, in addition, the emulsion is formed in relatively thin films or layers which facilitate treatment both directly by the electric field and indirectly by the ionizing action of the electric field on the gas masses.

It is a further object of the invention to entrain a gas in the incoming emulsion in a high-pressure zone, and to subsequently move the emulsion with its entrained gas into a low-pressure zone so that the gas is liberated and expands to form the gas-emulsion mixture. This liberation and expansion of the gas appears to have a very desirable action on the treating efficiency, probably because the expansion of the gas affects the interfacial forces of the emulsion, somehow making this emulsion more susceptible to electric treatment.

It should not be understood, however, that it is in all instances necessary to separately entrain the gas in the emulsion. Some emulsions, especially when freshly produced, already contain relatively large quantities of gas entrained therein. Under sufficient pressure this gas can be retained in its entrained state, being liberated only upon decrease in pressure. Thus, it is an object of the invention to provide a novel method and apparatus for treating an emulsion containing entrained gas by lowering the pressure on this emulsion to such an extent that a large portion of the entrained gas is liberated but remains associated with the emulsion during electric treatment thereof.

It is a further object of the present invention to introduce dry oil or other dielectric liquid into a treating space containing a gas-emulsion mixture, or to otherwise prevent any excessive current flow which may tend to form between the electrodes when certain wet emulsions are being treated. In this connection the conductivity of a given emulsion can be decreased by the mere formation of a gas-emulsion mixture therefrom and many emulsions which would themselves produce short-circuiting chains if introduced into an electric field can be made treatable by the formation of a gas-emulsion mixture, such treatment being often entirely successful regardless of whether an auxiliary dielectric liquid is introduced. Thus, my process makes treatable emulsions which are not per se susceptible to electric treatment.

It is a further object of the invention to maintain a low back-pressure on the treating space so as to facilitate the liberation of the gas and the formation of the gas-emulsion mixture.

Such a gas-emulsion mixture, or a foam, tends to rise in the treating space. It is usually desirable to introduce a high potential into the treating space from the upper end and it is an object of the present invention to protect the insulator means which is usually positioned in the upper end of the container from direct contact with the foam or gas-emulsion mixture which, due to its low density, tends to rise in the container.

In some instances it is desirable to heat the constituents to be treated, or to treat these constituents at temperatures above atmospheric. In some instances the emulsion can be heated before the gas is entrained therein, but due to the fact that the solubility of the gas in the emulsion is decreased by the application of heat I prefer to heat the gas-emulsion mixture after it has been formed, if heating is found desirable. It is an object of the invention to produce a method and apparatus for accomplishing this result.

Further objects and advantages of the invention will be made evident to those skilled in the art from the following description.

Referring to the drawing, I have shown for illustrative purposes one form of horizontal-flow treater particularly adapted to the electric treatment of crude petroleum emulsions. Other forms of treaters may be used, and the form of treater shown can also be used with emulsions other than raw petroleum emulsions.

In the treating system shown the incoming emulsion moves through a pipe 10, being pumped by a pump 12 into a high-pressure zone. Similarly, the gas, usually natural gas or other substantially non-condensable, inert gas, is forced by a pump 13 from a pipe 14 into the same high-pressure zone. In this high-pressure zone the gas becomes entrained in the emulsion, it being understood that the word "entrained" does not necessarily infer that the gas is merely compressed while still maintaining its identity distinct from the emulsion. In some instances the gas can actually go completely into solution in the emulsion, the gas being in solution in the emulsion in the true sense of the word. The solubility of gases in liquids increases with increase in pressure, and an amazing amount of gas can be actually dissolved in a liquid by the use of appropriate pressures. The amount of gas entrained can thus be an amount equal to or lower than will actually dissolve in the emulsion. In other instances even a greater quantity of gas can be entrained, in which event the emulsion is not only saturated, but certain masses of the gas will be physically associated therewith, the word "entrained" covering both concepts.

Entraining of the gas in the emulsion is facilitated by agitation, though such agitation need not always be used. In the preferred embodiment I include in the high-pressure zone a gas-entraining device 15 which may comprise merely a chamber, but which usually includes some auxiliary means in the chamber for facilitating entrainment, usually by agitation. Various devices of this character are known to the art. I have shown a valve 16 controlling the flow of the emulsion reaching the gas-entraining device 15 and a valve 17 controlling the flow of gas into this device. So also, a by-pass pipe 19 is shown, permitting the incoming emulsion to by-pass the gas-entraining device 15 if the emulsion already has sufficient gas entrained therein. A valve 20 controls the flow through the pipe 19.

The emulsion containing the entrained gas may, if desired, be moved through a heater 20a, though in some instances such a heater may be dispensed with. The emulsion containing the entrained gas then moves through a pipe 21 which may contain a control valve 22, usually open, this pipe extending through a plate 23 closing one end of a pipe-T 24. The inner end of this pipe 21 may be constricted to form a nozzle 25 providing a constricted passage 26. The pressure in the pipe-T 24 is maintained much lower than the pressure in the high-pressure zone which feeds the nozzle 25, this being accomplished by means which will be hereinafter described. Incoming emulsion containing the entrained gas is thus moved into a low-pressure zone and the entrained gas is wholly or partially liberated to form a gas-emulsion mixture which moves longitudinally through a pipe 28 which forms an outer electrode. An inner electrode 29 extends into the pipe 28 and cooperates therewith in defining a treating space 30. The inner electrode 29 is preferably in the form of a small rod, that end of the rod closest the nozzle 25 being pointed as indicated by the numeral 31.

A flange 34 may be welded or otherwise secured to the pipe 28 and closes one end of a large pipe-T 35 including an upward extending leg 36 which, in conjunction with a riser 37 and a plate 38, forms an insulator chamber 39. Insulating means is provided in this chamber for supporting the inner electrode 29. In the embodiment shown this insulating means takes the form of an insulator bushing 40 through which a conductor 41 extends, the lower end of this conductor carrying a frame-work 42 which directly supports the inner electrode 29. An intense electric field is established in the treating space 30 by any suitable potential source, the source shown including a transformer 44 providing a secondary winding 45, one terminal of which is connected to the conductor 41 by a wire 46 and thus to the inner electrode 29, the other terminal being grounded by a wire 47 to the pipe 28 which forms the outer electrode. Commercial frequency, high frequency, or peaked potentials may be applied to the primary winding of the transformer 44, or this transformer may be eliminated and other potential sources utilized.

In view of the fact that the gas-emulsion mixture or foam tends to rise in the insulator chamber 39 and thus come into contact with the insulating means 40, I find it sometimes desirable to prevent direct contact therebetween by flowing an envelope of a dielectric liquid along the surface of this insulating means. In the form shown a pipe 50 of annular shape surrounds this insulating means 40 and provides means for flowing an envelope of dry oil downward along the surface thereof. This means may include an annular orifice formed in the pipe 50, or the pipe may be perforated at frequent intervals as shown, so that in effect an annular stream of dry oil flows along the surface of the insulator means 40. This dry oil reaches the annular pipe 50 through a pipe 52 including a valve 53 and communicating with a source of dry oil 54.

The source of dry oil 54 can also be used to advantage in treating certain emulsions by supplying to a leg 56 of the pipe-T 24 a stream of dry oil, this stream being controlled by a valve 57. As disclosed, the pipe 21 extends into the pipe-T 24 to a position beyond the leg 56 so that an annular space 58 is provided, the dry oil being introduced into this space and flowing therealong toward the nozzle 25. Usually a major portion of this dry oil becomes intermixed with the gas-emulsion mixture due to the excessive agitation which takes place at the discharge end of the restricted passage 26 when the gas is liberated and expands. In this instance the dry oil at least partially mixes with the gas-emulsion mixture. In other instances, if the agitation is not too severe, the dry oil can flow into the treating space in the form of a more or less well defined annular envelope surrounding the gas-emulsion mixture. This method of introducing dry oil adjacent a restricted orifice acting to expel entrained gases is believed to be new.

In this form of the invention the low-pressure zone may include the annular space 58, the treating space 30, and the interior of the large pipe-T 35. In order that liberation of the gas be facilitated, it is desirable that no large amount of back pressure be built up which would impede the formation of the gas-emulsion mixture. Thus, it is desirable to use a low back-pressure means for withdrawing the treated emulsion constituents and the other products from the treating space 30 and the large pipe-T 35. In accomplishing this end, suitable vacuum means may be employed for removing the treated gas-emulsion mixture. Usually, however, it is not essential to reduce the pressure to a value below atmospheric, though it will be understood that this can be done, especially if it is desired that the pressure in the high-pressure zone be not too high. It is the differential pressure existing between the high-pressure zone and the low-pressure zone which is possibly the most important factor in liberating the gas, and this pressure differential can, of course, be controlled by the amount of pressure in the low-pressure zone, as well as by the amount of pressure in the high-pressure zone.

In the embodiment shown the low back-pressure means may include a nipple 60 communicating with the pipe-T 35 to receive the treated products, and communicating with a pipe 61, which preferably, though not necessarily, drops downward to a level below the level of the pipe-T 35. This is especially desirable if a settling tank is used for separating the constituents as disclosed in the accompanying drawing, for the treated constituents can be moved from the pipe 61 into a spray pipe 62 disposed in a settling tank 63, the upper end of which is not materially above the pipe-T 35. In some instances, however, this lower elevation of the tank 63 is not necessary, the slight amount of back pressure built up by the head of liquid in the settling tank being unobjectionable. In the settling tank 63 the emulsion constituents separate from the gas, the gas being discharged through a pipe 65. So also, this settling tank can be used for separating the phases of the emulsion, the oil being removed through a pipe 64 and the water being removed through a pipe 67.

It will be clear, however, that other types of separating means may be utilized, separation being effected either by the use of gravitational or centrifugal forces, or by other means known to the art.

The most desirable pressures for a given emulsion can best be determined empirically, different emulsions treating best at different pressures. So also, the pressure differential maintained between the high-pressure and low-pressure zones can best be determined empirically.

The best available temperature can also be determined empirically and no fixed rule can be set down as to optimum temperatures for all emulsions. With many emulsions, temperature considerations are important and facilitate the formation of the gas-emulsion mixture. The amount of gas which can be dissolved into the emulsion is also a function of the temperature.

While in the embodiment shown a separate step of entraining the gas is provided, it will be understood that in some instances it is unnecessary to entrain the gas as a separate step of the process. Thus, many emulsions already contain sufficient entrained gas to form the gas-emulsion mixture, or in some instances the foam hereinbefore defined, if the pressure thereon is decreased materially.

While I have set forth in detail one embodiment of the invention for the purpose of illustration, it will be clear that other related embodiments may be utilized. Thus, certain steps of the process, as well as certain features of the apparatus, can be changed without departing from the spirit of this invention.

I claim as my invention:

1. A method of electrically treating an emulsion, which method includes the steps of: forming said emulsion into a foam comprising masses of a substantially non-condensable gas surrounded by said emulsion, the volume of said gas in said foam being at least as great as the volume of the emulsion in said foam; subjecting said foam to the action of an electric field; and seperating said gas from the constituents of said emulsion.

2. A method of electrically treating an emulsion which contains therein an entrained gas, which method includes the steps of: decreasing the pressure on said emulsion sufficient to form a gas-emulsion foam; subjecting said gas-emulsion foam to the action of an electric field of sufficient intensity to ionize at least a part of the gas in said gas-emulsion foam; separating said gas from the constituents of said emulsion; and separating the constituents of said emulsion.

3. A method of electrically treating an emulsion which emulsion contains therein an entrained gas, which method includes the steps of: moving said emulsion in which said gas is entrained from a high-pressure zone into a low-pressure zone through a restricted passage to reduce the pressure thereon whereby the gas entrained in said emulsion is liberated to form a gas-emulsion foam; subjecting said gas-emulsion foam to the action of an electric field; and separating said gas from the constituents of said emulsion.

4. A method of electrically treating an emulsion, which method includes the steps of: entraining a gas in said emulsion in a high-pressure zone by pumping said gas into said high-pressure zone while said emulsion is present therein; materially reducing the pressure on said emulsion and its entrained gas to cause said gas to expand and form a gas-emulsion mixture; subjecting said gas-emulsion mixture to an electric field; and thereafter separating the constituents of said emulsion and said gas.

5. A method of electrically treating an emulsion, which method includes the steps of: entraining a gas in said emulsion in a high-pressure zone by pumping said gas into said high-pressure zone while said emulsion is present therein; heating the emulsion and its entrained gas; lowering the pressure on said heated emulsion and its entrained gas to cause said gas to expand and form a gas-emulsion mixture; subjecting said gas-emulsion mixture to an electric field; and separating the constituents of said emulsion and said gas.

6. A method of electrically treating an emulsion, which method includes the steps of: entraining a gas in said emulsion in a high-pressure zone by pumping said gas into said high-pressure zone while said emulsion is present therein; establishing an electric field; moving said emulsion into and from said electric field; reducing the back pressure on said electric field to a value much lower than the pressure in said high-pressure zone whereby the gas entrained in said emulsion is released due to said low back pressure to form a gas-emulsion mixture; moving the treated gas-emulsion mixture from said field before substantial separation of the emulsion constituents takes place; and separating said emulsion constituents from each other and from said gas in a separating zone removed from said treating space.

7. A method of electrically treating an emulsion, which method includes the steps of: entraining a gas in said emulsion in a high-pressure zone by pumping said gas into said high-pressure zone while said emulsion is present therein; establishing an electric field; moving said emulsion into and from said electric field; reducing the back pressure on said electric field to a value much lower than the pressure in said high-pressure zone whereby the gas entrained in said emulsion is released due to said low back pressure to form a gas-emulsion mixture; moving the treated gas-emulsion mixture from said field before substantial separation of the emulsion constituents takes place; separating said emulsion constituents from each other and from said gas in a separating zone removed from said treating space; and maintaining a low pressure in said separating zone comparable to the back pressure exerted on the material flowing from said electric field.

8. A method of electrically treating an emulsion by the use of an electric field established between electrodes associated with an insulating means, which method includes the steps of: forming said emulsion into a low-density foam comprising masses of substantially non-condensable gas surrounded by layers of said emulsion, said foam tending to surround said insulating means; establishing an electric field; electrically treating said foam by subjecting it to said electric field; and flowing a stream of a dielectric liquid along said insulating means to prevent contact between said foam and said insulating means.

WILLIAM WOELFLIN.